US009369442B2

(12) United States Patent  (10) Patent No.: US 9,369,442 B2
Mayer  (45) Date of Patent: Jun. 14, 2016

(54) SYSTEM AND METHOD FOR THE SAFE SPONTANEOUS TRANSMISSION OF CONFIDENTIAL DATA OVER UNSECURE CONNECTIONS AND SWITCHING COMPUTERS

(75) Inventor: Pavel Mayer, Berlin (DE)

(73) Assignee: Hoccer GmbH, Berlin (DE)

( * ) Notice: Subject to any disclaimer, the term of this patent is extended or adjusted under 35 U.S.C. 154(b) by 142 days.

(21) Appl. No.: 14/345,687

(22) PCT Filed: Sep. 14, 2012

(86) PCT No.: PCT/EP2012/068115
§ 371 (c)(1),
(2), (4) Date: Mar. 19, 2014

(87) PCT Pub. No.: WO2013/041460
PCT Pub. Date: Mar. 28, 2013

(65) Prior Publication Data
US 2014/0208118 A1    Jul. 24, 2014

(30) Foreign Application Priority Data
Sep. 20, 2011   (DE) .......................... 10 2011 083 062

(51) Int. Cl.
*H04L 9/32*   (2006.01)
*H04L 29/06*  (2006.01)
*H04L 9/08*   (2006.01)

(52) U.S. Cl.
CPC .......... *H04L 63/0428* (2013.01); *H04L 9/0825* (2013.01); *H04L 9/0827* (2013.01); *H04L 9/0894* (2013.01)

(58) Field of Classification Search
CPC . H04L 63/0428; H04L 9/0827; H04L 9/0894; H04L 9/0825; H04L 9/0822; H04L 9/0891; H04L 9/30; H04L 29/06666; H04L 2209/26
See application file for complete search history.

(56) References Cited

U.S. PATENT DOCUMENTS

| 2004/0034776 | A1  |   2/2004 | Fernando et al. |
| 2004/0120527 | A1  |   6/2004 | Hawkes et al. |
| 2006/0182277 | A1* |   8/2006 | Sandhu ................ H04L 9/0822 380/44 |
| 2006/0182282 | A1* |   8/2006 | Negahdar ............. H04L 9/0825 380/277 |
| 2007/0219915 | A1* |   9/2007 | Hatano ................. H04L 9/0825 705/57 |
| 2008/0075284 | A1* |   3/2008 | Ellison ............. G11B 20/00086 380/201 |
| 2008/0082822 | A1* |   4/2008 | Starrett ................. H04L 9/083 713/171 |
| 2009/0161869 | A1* |   6/2009 | Chow ................... H04N 7/1675 380/259 |
| 2010/0281265 | A1  |  11/2010 | Ogawa |
| 2012/0290837 | A1* |  11/2012 | Vion-Dury ............ H04L 9/14 713/167 |

FOREIGN PATENT DOCUMENTS

| CA | 2556155  | * |  9/2005 | ................ H04L 9/00 |
| GB | 2471079 A |   | 12/2010 | |

* cited by examiner

*Primary Examiner* — Krisna Lim
(74) *Attorney, Agent, or Firm* — The Webb Law Firm

(57) ABSTRACT

Disclosed is a method and system for transmitting data. The system includes at least one first stationary and/or mobile communication terminal at least one further second communication terminal and a switching unit reachable by all communication terminals via a data network. The communication terminals send data to the switching unit, which data are encrypted with a symmetric encryption method, and send the symmetric key encrypted with a public key of a key pair to the switching unit, so that the same can send it to other communication terminals, which in possession of an associated private key then are capable of accessing the information stored at the switching unit and decrypt the same.

15 Claims, 4 Drawing Sheets

SYSTEM AND METHOD FOR THE SAFE SPONTANEOUS TRANSMISSION OF CONFIDENTIAL DATA OVER UNSECURE CONNECTIONS AND SWITCHING COMPUTERS

CROSS-REFERENCE TO RELATED APPLICATIONS

This application is the United States national phase of International Application No. PCT/EP2012/068115 filed Sep. 14, 2012, and claims priority to German Patent Application No. 102011083062.6 filed Sep. 20, 2011, the disclosures of which are hereby incorporated in their entirety by reference.

BACKGROUND OF THE INVENTION

1. Field of the Invention

It frequently is desirable to spontaneously transmit digital data, in particular recordings such as images, films, sound recordings or written data such as addresses, texts, calendar entries, telephone numbers or any other confidential data from a first communication terminal of a first subscriber to a second communication terminal of a second subscriber.

In the following, an efficient method and an efficient system will be described, with which this is possible in particular for mobile communication terminals "ad hoc", i.e. without previous mutual exchange of addresses, on the basis of location data.

2. Description of Related Art

During the transmission of data via a data exchange system (wireless or wire-bound data transmission lines, switching computers etc.) the problem arises that the transmitted data possibly can be intercepted or viewed by third parties. For secure transmissions in the internet, a so-called transport encryption is used as prior art, in which the remote terminals agree upon a secret key e.g. by means of the Diffie-Hellman method.

A prerequisite, however, is that before establishment of the secure connection transmitter and receiver mutually exchange data, which in certain application scenarios is not possible or desirable.

In a system according to the prior art, secure connections to the switching and/or data exchange service are established by the transmitter and receiver, but on the part of the operator of the service the data are temporarily stored unencrypted and can be viewed by the operator or by third parties, when the same get access to the switching or data exchange service.

To minimize risks for the user and operator, it is desirable that data are encrypted by the transmitter such that they can only be decrypted by the receiver. This is also referred to as end-to-end encryption.

A solution according to the prior art consists in that the transmitter encrypts the data with a secret key, which it then communicates to the receiver on a confidential route. To simplify the problem of the transmission of keys, so-called asymmetric encryption methods have been available for many years, which will be explained below. All systems used in practice so far, however, have the problem that the user must generate and administer keys, which requires an additional effort, so that for reasons of convenience no encryption frequently is used.

When information is to be transmitted in encrypted form, so that it reaches only the desired receivers, an indirect transmission leads to a number of problems due to the fact that the data are stored centrally the receiver circle cannot explicitly be controlled by the transmitter in every application scenario it possibly is desired to keep the subscribers "anonymous" towards the central service it possibly is desired in particular to transmit and centrally store the data already before definition of the receiver circle.

To protect data against unauthorized access, a multitude of encryption methods and protocols are known. In general, data which also are referred to as plain text are transformed into an enciphered text by mathematical methods and a secret key, which enciphered text only can be decrypted again with a knowledge of the correct key, i.e. can be transformed back into plain text.

A distinction is made between symmetric methods, in which the same key is used for encryption and decryption, and asymmetric methods which for encryption require a different key than for decryption.

Asymmetric methods provide for publishing the key for encryption and hence generally encrypt messages to a receiver such that only the receiver in possession of the private key is able to decrypt this message.

Known and standardized symmetric encryption methods for example include DES and the successor AES, and useful asymmetric methods for example include the RSA method based on prime numbers and the EC method based on elliptic curves.

The known PGP (Pretty-Good-Privacy) method is used to encrypt for example electronic mail. The transmitter needs the public key of the receiver for encrypting a message, which only can be decrypted by an associated private key in possession of the receiver. In the case of PGP, however, it is required that the transmitter receives the public key from the receiver in advance, and in contrast to the method of the invention the receiver circle must be predetermined when sending the data and for each receiver a public key must exist.

In section X.509 of the so-called X.500 standard of the ITU there is likewise defined a method for the exchange of keys within an address directory infrastructure, which fulfills a similar purpose as embodiments described below. In X.509 however it is required that keys are provided with a digital signature by a higher instance, so that transmitter and receiver require additional certificates.

The methods and systems described below can be rendered more secure against attacks from a fourth side, by additionally utilizing X.509 transport encryption on the route to the switching computer. Fourth side is meant to be an attacker who does not belong the circle of transmitter, receiver and system operator.

In the following, a method is described which provides for an end-to-end encryption for a system of the spontaneous data transmission as described above.

End-to-end encryption means that on the route between transmitter and receiver the data are not decrypted, so that the system operator also has no access to the data transmitted by the users. This contrasts with the usual transport encryption on partial routes, in which a system present on the transport route decrypts the data and newly encrypts the same, so that the operator of the switching system has access to the data in plain text. Such methods are used for example in the so-called E-Postbrief or DE-Mail.

Another known method, which serves a similar purpose as the method according to the invention, is the so-called "Off-The-Record-Messaging" or OTR. However, the same carries out a Diffie-Hellman key exchange and in its features and methods substantially differs from the method according to the invention.

The methods and systems described here provide for having the key exchange take place automatically and for storing the encrypted data on the central service, even if the receiver circle is not yet known.

BRIEF DESCRIPTION OF THE DRAWINGS

Embodiments will be explained by way of example with reference to Figures, in which.

DESCRIPTION OF THE INVENTION

Figure 1:
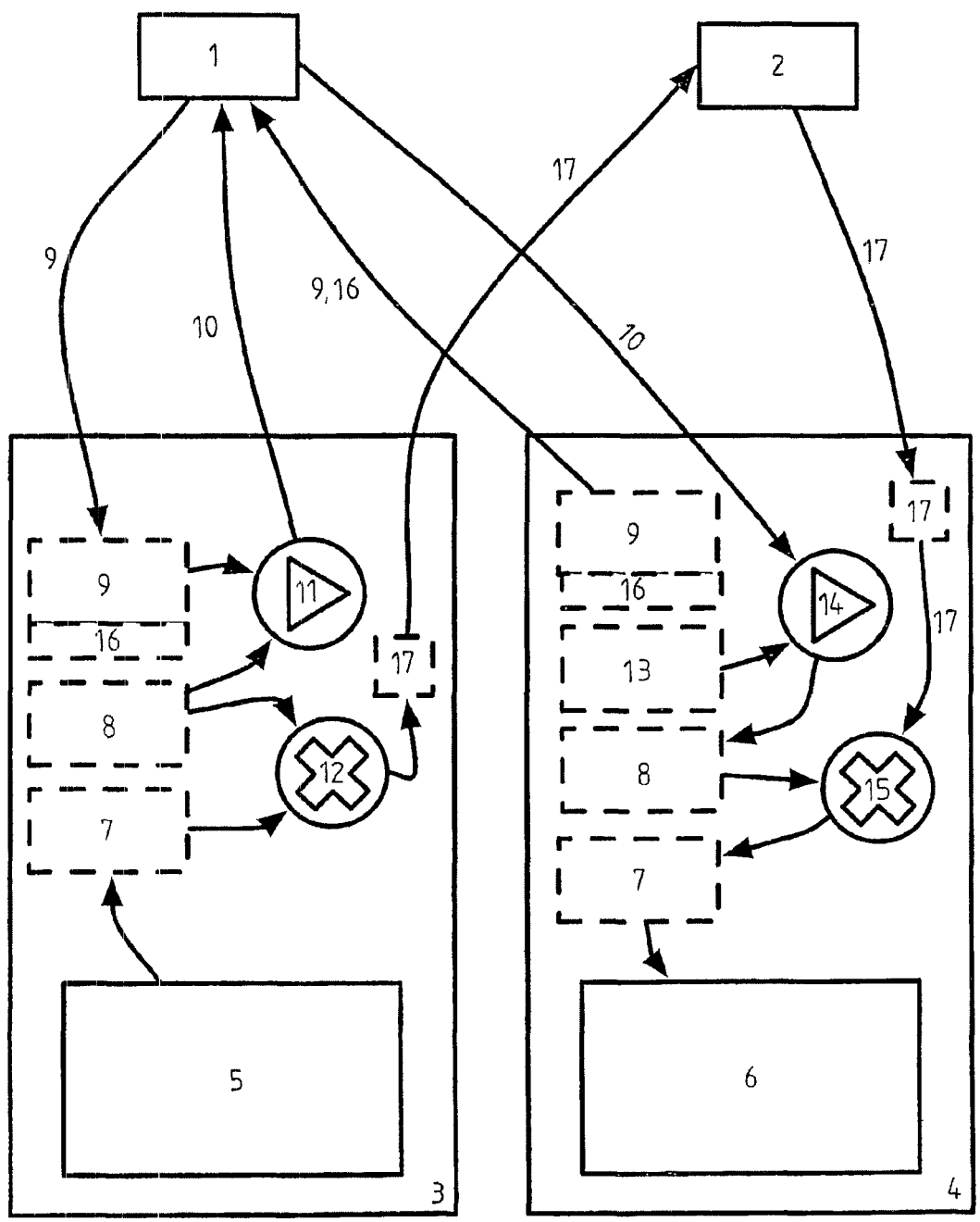
FIG. 1 shows a schematic representation of an embodiment of the system.
Figure 2:
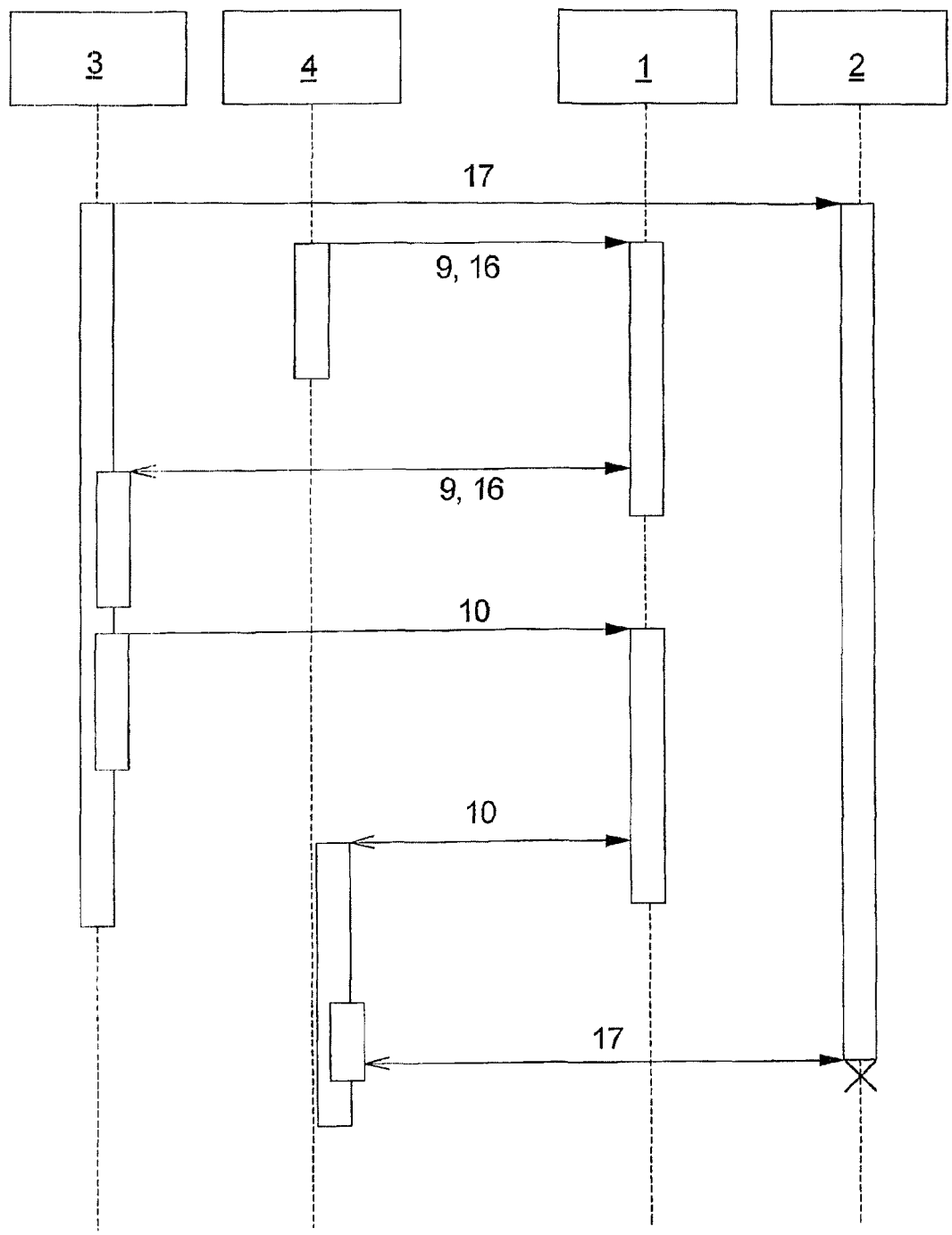
FIG. 2 shows a sequential representation of an embodiment of the method.
Figure 3:
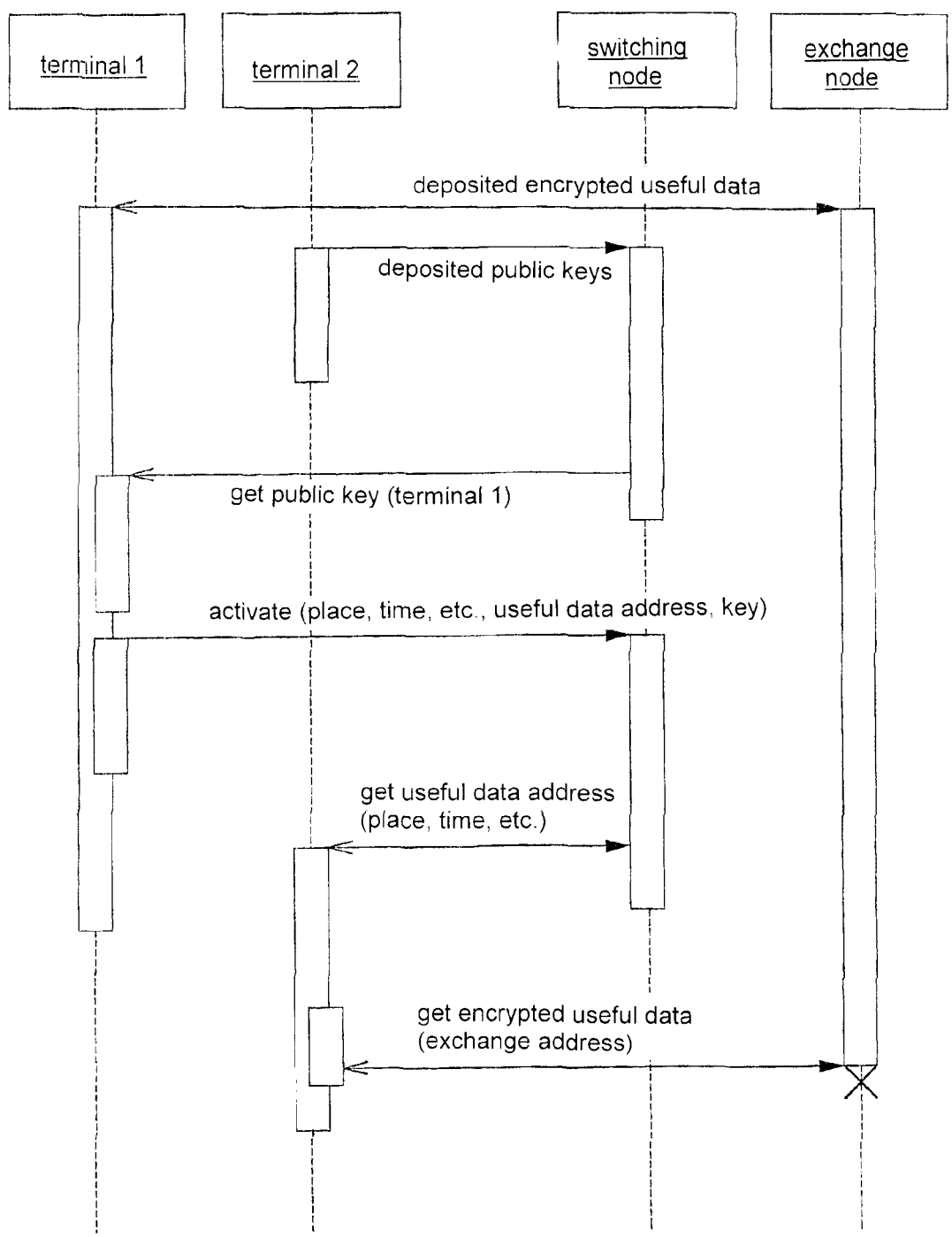
FIG. 3 shows another representation of FIG. 1.
Figure 4:
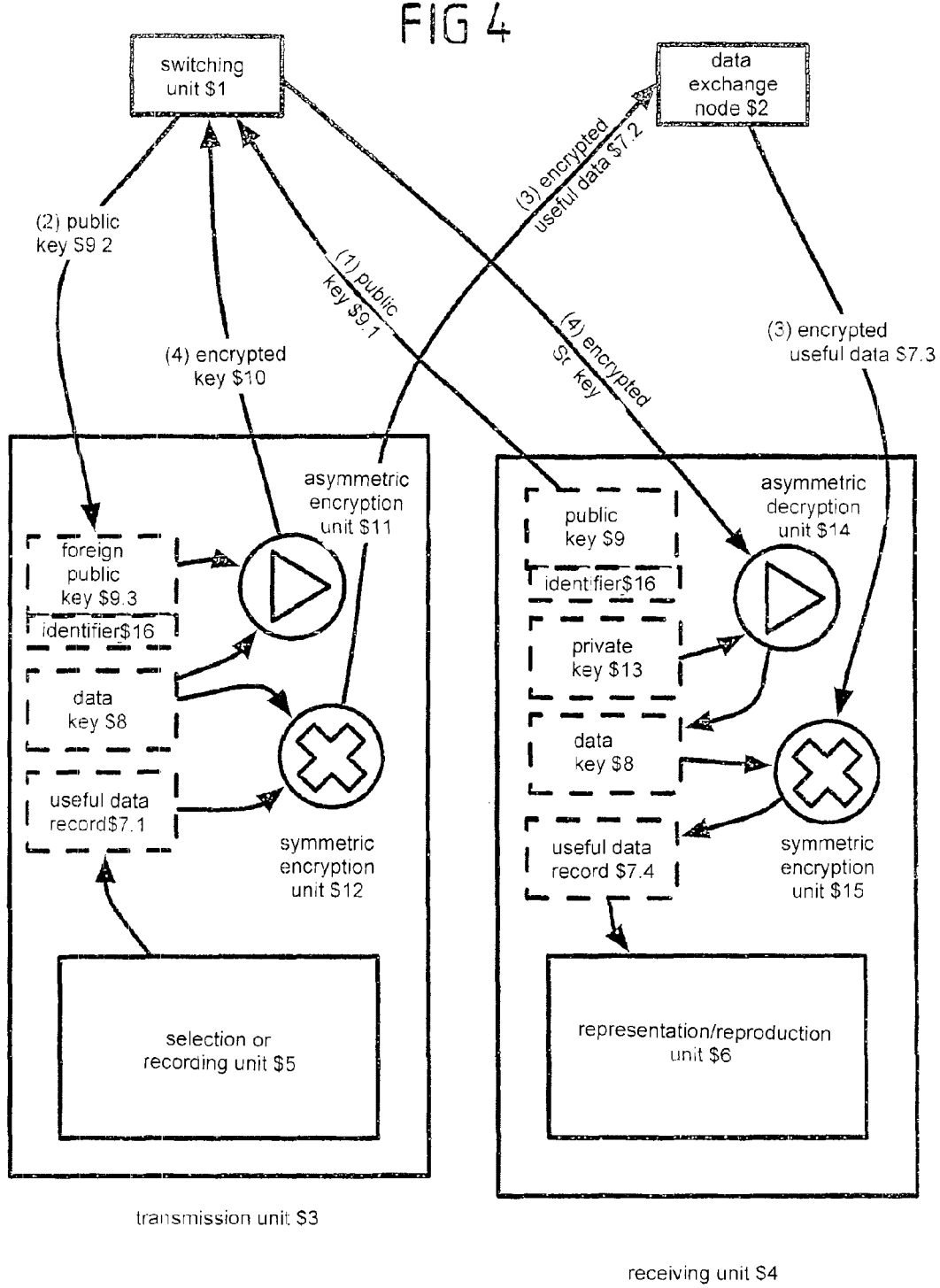
FIG. 4 shows another representation of FIG. 2.

One embodiment is set up as follows:
A switching unit 1, a data exchange node 2, a transmitting unit 3 and a receiving unit 4 are spatially separate units which can exchange data through a network such as e.g. the internet.

The transmitting unit 3 includes a selection or recording unit 5 which provides for selecting useful data, which for example represent texts or images, from a memory or record the same with a camera or keyboard.

This selection or recording unit 5 supplies a useful data record 7, which by using a key data record 8 from a symmetric encryption unit 12 generates an encrypted useful data record 17 and via a network transmits the same to the data exchange node 2, where the encrypted useful data record 17 is stored temporarily.

The receiving unit 4 contains a key pair for asymmetric cryptography, consisting of the public key 9 and the private key 13. The public key 9 together with an unambiguous station identifier 16 is transmitted to a switching unit 1 and temporarily stored there.

When the encrypted useful data 17 deposited already on the data exchange node 2 are to be transmitted by the transmitting unit 3 to the receiving unit 4 designated by the station identifier 16, the transmitting unit 3 initially requests the public key of the receiving unit 4 from the switching unit 1.

The foreign public key 9 is temporarily stored in the transmitting unit and then used to generate from the data key 8 by means of the asymmetric encryption unit 11 an encrypted data key 10 which then together with the address of the encrypted useful data 17 lying on the data exchange node 2 is transmitted to the switching unit 1, from where the encrypted useful data are retrieved by the receiving unit 4.

In the receiving unit 4, the encrypted data key 10 initially is decrypted by using the private key 13 from an asymmetric encryption unit 14, so that now the data key 8 also is present in the receiving unit 4.

By using the data key 8, the decrypted useful data record 7 now is generated by the symmetric decryption unit 15, which then is presented to the user by the representation and reproduction unit 6 in the receiving unit 4.

The representation and reproduction unit 6 for example is a display or a loudspeaker in combination with an electronic system, which by means of the useful data 7 actuates the display or the loudspeaker such that a pictorial representation or audible output of the useful data 7 is effected.

For the operator of the switching service 1, the exchange service 2, all other potential receivers and every other possible reader of the data traffic a decryption of the useful data 7 practically is not possible, when encryption methods secure according to the prior art are used with sufficiently random keys of sufficient length and the private key 13 is safely stored in the receiving unit 4.

An essential difference to existing methods like PGP, in which contents are encrypted with a symmetric key and are transmitted together with the asymmetrically encrypted symmetric key, here consists in that content and key are separate from each other and are stored or sent separately, so that uploading encrypted data to the central service is possible already before the selection and/or definition of the receiver.

For sending encrypted data to a plurality of receivers, the described method is expanded such that the transmitter sends a plurality of copies of the symmetric key encrypted with different public keys and each receiver identifies the part decryptable by it and uses the same for decrypting the useful data.

Pairs of public keys and associated key or user IDs can be stored locally by subscribers, so as not to have to each time ask the receiver or the central service for the same key in the case of repeated encrypted data transmissions with the same receivers.

The described method can be used without subscribers necessarily having to maintain an identity existing in addition to an individual transaction. In particular, the used pair of keys can easily be changed at any time.

The invention claimed is:

1. A system for transmitting data, comprising:
a) at least one first communication terminal,
b) at least one further second communication terminal, and
c) a switching unit operable to communicate with said communication terminals, wherein
d) the first and second communication terminals send data to the switching unit, said data encrypted using a symmetric key, and
e) the symmetric key is sent to the switching unit encrypted with a public key of a key pair, so that the switching unit sends it to at least a third receiving communication terminal,
f) said third communication terminal in possession of a private key associated with the public key of the key pair accesses and decrypts encrypted data stored at the switching unit.

2. The system according to claim 1, wherein information is sent to a plurality of receiving communication terminals at the same time, wherein the symmetric key is sent encrypted with different public keys.

3. The system according to claim 1, wherein a communication terminal sends data in a symmetrically encrypted form to the switching unit already before selection of public keys to be used for encryption of the symmetric key.

4. The system according to claim 1, wherein the receiving communication terminal data transmission is defined by the switching unit on the basis of information sent by the communication terminals.

5. The system according to claim 1, wherein the switching unit automatically sends information to be transmitted and/or the associated keys to the receiving communication terminal.

6. The system according to claim 1, wherein the communication terminals are capable of exchanging public keys directly among each other.

7. The system according to claim 1, wherein public keys can be deposited by the communication terminals with the switching unit and can be retrieved from there.

8. The system according to claim 5, wherein the switching unit stores public keys together with an ID, wherein the ID is hashed and stored and the switching unit can return the key in the case of an inquiry.

9. The system according to claim 5, wherein a communication terminal can ask the switching unit for potential receivers, and public keys or associated IDs stored thereby can be transmitted from the switching unit to the terminal.

10. The system according to claim 1, wherein communication terminals can change their key pair by a manual intervention or automatically in certain time intervals, after each transaction, with every restart or upon occurrence of other defined events.

11. The system according to claim 1, wherein terminals can locally store public keys or an allocation of keys and IDs in addition to an individual transaction.

12. The system according to claim 1, wherein the encryption can be effected automatically for a plurality of terminals or public keys on the terminal defined by the communication terminal and/or the switching unit.

13. The system according to claim 1, wherein JavaScript code is used for encryption or decryption.

14. The system according to claim 1, wherein a transmitting unit further comprises a selection or recording unit for selecting useful data, representing texts or images, from a memory or record.

15. A system for transmitting data, comprising:
a) at least one first communication terminal,
b) at least one further second communication terminal,
c) a switching unit operable to communicate with said communication terminals,
d) at least one further third communication terminal with a means for transmitting data to the switching unit, said data are encrypted using a symmetric key, and
e) a means for sending the symmetric key encrypted with a public key of a key pair to the switching unit,
so that the switching unit sends it to at least the first or second communication terminal, said first or second communication terminal in possession of a private key associated with the public key of the key pair accesses and decrypts encrypted data stored at the switching unit.

* * * * *